US008392853B2

(12) United States Patent
Shipley

(10) Patent No.: US 8,392,853 B2
(45) Date of Patent: Mar. 5, 2013

(54) TRANSPARENT INTERFACE USED TO INDEPENDENTLY MANIPULATE AND INTERROGATE N-DIMENSIONAL FOCUS OBJECTS IN VIRTUAL AND REAL VISUALIZATION SYSTEMS

(75) Inventor: Scott T. Shipley, Fairfax, VA (US)

(73) Assignee: Wxanalyst, Ltd., Fairfax, VA (US)

( * ) Notice: Subject to any disclaimer, the term of this patent is extended or adjusted under 35 U.S.C. 154(b) by 697 days.

(21) Appl. No.: 12/585,025

(22) Filed: Sep. 1, 2009

(65) Prior Publication Data

US 2011/0016433 A1 Jan. 20, 2011

Related U.S. Application Data

(60) Provisional application No. 61/213,808, filed on Jul. 17, 2009.

(51) Int. Cl.
*G06F 3/048* (2006.01)
(52) U.S. Cl. ........ 715/848; 715/849; 715/850; 715/851; 715/852
(58) Field of Classification Search .................. 715/848, 715/849
See application file for complete search history.

(56) References Cited

U.S. PATENT DOCUMENTS

| | | | | |
|---|---|---|---|---|
| 5,177,474 | A | * | 1/1993 | Kadota .......................... 345/642 |
| 5,361,349 | A | | 11/1994 | Sugita et al. |
| 5,528,735 | A | * | 6/1996 | Strasnick et al. ............. 345/427 |
| 5,592,599 | A | * | 1/1997 | Lindholm ..................... 345/427 |
| 5,923,324 | A | | 7/1999 | Berry et al. |
| 5,926,179 | A | | 7/1999 | Matsuda et al. |
| 5,999,185 | A | | 12/1999 | Kato et al. |
| 6,075,536 | A | | 6/2000 | Kunieda et al. |
| 6,184,860 | B1 | * | 2/2001 | Yamakawa .................... 715/823 |
| 6,247,019 | B1 | | 6/2001 | Davies |
| 6,281,899 | B1 | * | 8/2001 | Gould et al. .................. 715/848 |
| 6,330,356 | B1 | | 12/2001 | Sundareswaran et al. |
| 6,401,102 | B1 | | 6/2002 | Ishii et al. |
| 6,578,090 | B1 | | 6/2003 | Motoyama et al. |
| 6,734,884 | B1 | | 5/2004 | Berry et al. |
| 6,765,567 | B1 | | 7/2004 | Roberson et al. |
| 6,798,407 | B1 | | 9/2004 | Benman |
| 6,972,757 | B2 | * | 12/2005 | Arikawa et al. ............... 345/419 |
| 7,043,695 | B2 | | 5/2006 | Elber et al. |
| 7,148,887 | B2 | | 12/2006 | Kaufman et al. |
| 7,190,378 | B2 | | 3/2007 | Sauer et al. |
| 7,212,200 | B2 | | 5/2007 | Fujita et |
| 7,250,944 | B2 | | 7/2007 | Anderson et al. |
| 7,299,256 | B2 | | 11/2007 | Pradhan et al. |
| 7,394,459 | B2 | | 7/2008 | Bathiche et al. |
| 7,475,357 | B2 | | 1/2009 | Takeuchi et al. |
| 7,479,967 | B2 | | 1/2009 | Bachelder et al. |
| 7,492,362 | B2 | | 2/2009 | Sakagawa et al. |
| 7,505,048 | B2 | * | 3/2009 | Su ................................. 345/629 |

(Continued)

*Primary Examiner* — Stephen Alvesteffer
(74) *Attorney, Agent, or Firm* — Nath, Goldberg & Meyer; Jerald L. Meyer; Stanley N. Protigal

(57) ABSTRACT

Method, system, and software for performing independent operations with and upon N-Dimensional spatial and temporal objects displayed in virtual and real visualization systems. The technique applies user selected points or regions of interest in the visualization system to identify corresponding points or regions on transparent focus objects which describe the visualized objects, and which intersect the user's topological line of sight. The resulting set of points or regions are then used to extract information from the focus objects, which provide additional information on object content or location of related file systems. The transparent interface provides intrinsic operations which can be applied directly to the focus objects, or coupling mechanisms to external user applications, to process, manipulate or transform focus objects in either the transparent interface or the visualization system.

18 Claims, 8 Drawing Sheets
(1 of 8 Drawing Sheet(s) Filed in Color)

U.S. PATENT DOCUMENTS

| | | |
|---|---|---|
| 7,692,649 B2 * | 4/2010 | Elsberg et al. ............... 345/423 |
| 7,974,461 B2 * | 7/2011 | England et al. ............... 382/154 |
| 8,132,122 B2 * | 3/2012 | Risch et al. .................... 715/850 |
| 2003/0020707 A1 | 1/2003 | Kangas et al. |
| 2003/0080975 A1 | 5/2003 | Kuroki et al. |
| 2003/0098863 A1 | 5/2003 | Fujita et al. |
| 2003/0234782 A1 * | 12/2003 | Terentyev et al. ............ 345/421 |
| 2004/0036721 A1 | 2/2004 | Anderson et al. |
| 2004/0133552 A1 | 7/2004 | Greenfield et al. |
| 2005/0028111 A1 * | 2/2005 | Schrag et al. ................. 715/851 |
| 2005/0131857 A1 | 6/2005 | Fujiki et al. |
| 2006/0004512 A1 * | 1/2006 | Herbst et al. ................. 701/208 |
| 2006/0112346 A1 | 5/2006 | Miksovsky et al. |
| 2006/0117267 A1 | 6/2006 | Koralski et al. |
| 2006/0200662 A1 | 9/2006 | Fulton et al. |
| 2006/0238383 A1 * | 10/2006 | Kimchi et al. ............. 340/995.1 |
| 2006/0250322 A1 | 11/2006 | Hall et al. |
| 2007/0183430 A1 | 8/2007 | Asmussen |
| 2007/0266019 A1 | 11/2007 | Lavi |
| 2007/0266029 A1 | 11/2007 | Baskey et al. |
| 2008/0059889 A1 * | 3/2008 | Parker et al. .................. 715/748 |
| 2008/0068379 A1 | 3/2008 | Larsen et al. |
| 2008/0071770 A1 | 3/2008 | Schloter et al. |
| 2008/0309874 A1 | 12/2008 | Zuccolotto et al. |
| 2008/0312987 A1 * | 12/2008 | Damodaran et al. ............. 705/7 |
| 2009/0009516 A1 | 1/2009 | Tsao |
| 2009/0153550 A1 | 6/2009 | Keaney et al. |
| 2009/0198767 A1 * | 8/2009 | Jakobson et al. ............. 709/203 |
| 2009/0327071 A1 * | 12/2009 | Kreft ........................ 705/14.49 |
| 2010/0177120 A1 * | 7/2010 | Balfour ......................... 345/647 |
| 2010/0299630 A1 * | 11/2010 | McCutchen et al. ......... 715/803 |

* cited by examiner

TRANSPARENT INTERFACE USED TO INDEPENDENTLY MANIPULATE AND INTERROGATE N-DIMENSIONAL FOCUS OBJECTS IN VIRTUAL AND REAL VISUALIZATION SYSTEMS

RELATED APPLICATIONS

The present Patent Application claims priority to Provisional Patent Application No. 61/213,808 filed Jul. 17, 2009, which is assigned to the assignee hereof and filed by the inventor hereof and which is incorporated by reference herein.

BACKGROUND

1. Field

This disclosure relates to the three-dimensional and four-dimensional display of geographic data, and the combining of multi-dimensional data with a virtual display of a visualization system such as a geographical visualization system, in combination with multidimensional data superimposed on the visualization system.

2. Background

Visualization systems, including virtual globe (VG) systems such as NASA World Wind, Google™ Earth and Microsoft® Virtual Earth provide captivating animated 3D visualizations and support user queries for information at a point. The locations of displayed objects in such visualization systems are defined in the coordinate system of the visualization system. Thus, the apparent position of points on a displayed object depend on the 3D projection of the visualization system, and the 3D location of displayed objects relative to the 3D location of the user's eye position or Point of View (POV).

BRIEF DESCRIPTION OF THE DRAWINGS

The file of this patent contains at least one drawing executed in color. Copies of this patent with color drawing(s) will be provided by the Office upon request and payment of the necessary fee.

FIG. 6A shows a relationship between a focus object and the visualization, and FIG. 6B is a flow diagram of the functional operation.

DETAILED DESCRIPTION

Overview

Figure 1:
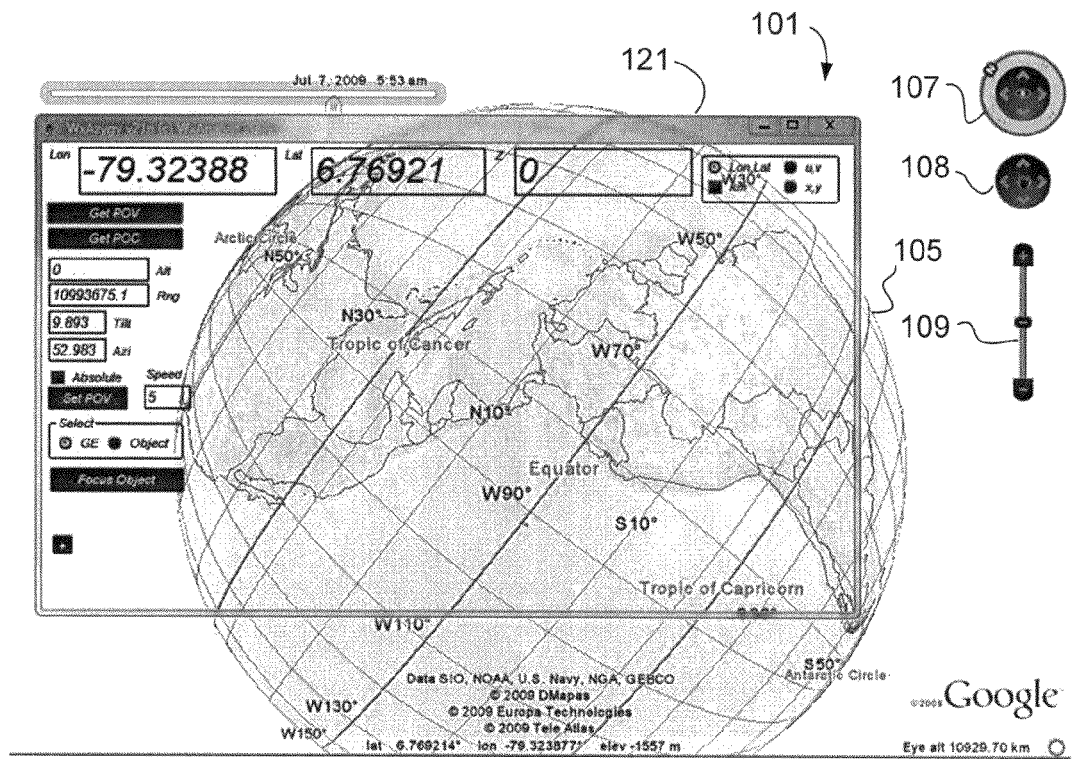
FIG. 1 is a diagram of an example presentation of a transparent interface.

Virtual Globe (VG) systems such as NASA World Wind, Google™ Earth and Microsoft® Virtual Earth provide captivating animated 3D visualizations and support user queries for information at a point. NASA MSFC's VG-based Real Time Mission Monitor (RTMM) enhances management and tracking of field experiment missions. The National Weather Service's RIDGE service uses VG to disseminate weather warnings with weather radar products and support decision assistance. Simpson Weather Associate's Doppler Wind LIDAR uses VG technology to couple external applications through an interface with Google™ Earth (GE). Such user applications are inherently limited by the existing VG interfaces. The method disclosed herein enhances the VG interface to embrace Geographic Information System (GIS) by inclusion of licensed GIS or the OGC GeoTools™ open source. Full GIS coupling through a transparent and overlaid interface provide a standard means for complex user operations in the VG environment. The independence of this interface decouples external functions from the VG, can provide security/privacy where needed, and could potentially encourage VG evolution. GIS-VG coupling can include the concept of a "focus object" which is mutually shared by the VG and interface.

A focus object can be described in Google™ Earth by KML 2.2. KML (Keyhole Markup Language) is an open standard officially named the OpenGIS®KML Encoding Standard (OGC KML), and maintained by the Open Geospatial Consortium, Inc. (OGC). Google™ Earth interaction is currently supported through an Application Programmer Interface (API) downloaded with each installation. The Google™ Earth API could become the basis for a standard for VG interfaces and be potentially extended. Possible capabilities in situ with VG include spatial data selection and cross referencing, comparison and cross-correlation of simultaneous and collocated data objects with disparate geometries, modification or editing of spatial data objects in a VG, and interaction with data servers to acquire, load and subset data "on the fly". This type of new technology enables greater utilization of extremely large, complicated, and highly distributed datasets on all spatial scales over large geographic areas.

A transparent interface is used to independently manipulate and interrogate N-Dimensional focus objects in virtual and real visualization systems. The operations are performed on N-Dimensional spatial, temporal or topological objects displayed in virtual and real visualization systems in a manner which is independent of each visualization system.

A transparent interface is used to describe N-Dimensional objects which are simultaneously shown in a connected visualization system, and which are aligned with the user's or operator's line of sight so that any feature of a transparent interface object is overlaid onto the corresponding point or region of the same feature as shown in the visualization system.

The method allows the user or operator to select an object (focus object) or set of objects (focus layer) from a collection of objects, and then applies user, operator or automated queries to a virtual point or region in the visualization system to identify points or regions on the focus object or focus layer which are coincident with the topological line of sight.

The resulting set of points or regions on the selected focus object or focus layer are used to extract information from the focus objects. The extracted information can be used as an index or link into related data, images, file systems, tables, or documents to extract additional information at the points or regions identified by the user or operator on the focus object or focus layer.

The method also supports the execution of external or intrinsic applications or tools which manipulate or transform the selected spatial objects in either the transparent interface or visualization system or in both of them. External or intrinsic applications include geospatial operations, spatial data selection and cross-referencing, comparison and cross-correlation of simultaneous and collocated data objects, object editing or transformation, and interaction with file systems or data servers to acquire and load data upon user request.

The present system provides a method, system, and program for operation of a transparent interface to independently manipulate and interrogate N-Dimensional focus objects in virtual and real visualization systems. The user is allowed to select one or more focus objects as the active focus object or focus layer. This allows users to work with focus objects having complex spatial geometries while simultaneously changing the user's position or Point of View (POV).

The example prototype uses 4D weather radar reflectivity data with multiple elevation angles to simultaneously display multiple elevation surfaces in a virtual globe. The focus object selection feature allows the user to select or "mouse click" on each radar elevation surface to extract information about location {longitude, latitude} and altitude {meters MSL} of N-Dimensional features in the visualization, independent of user point of view.

Representation of complex spatial objects allows depiction of items that are not easily described in current 3D geographic information systems (GIS). Such items include weather radar or satellite remote sensing data, which are typically approximated in common practice by extruded 2D shapes. It becomes difficult to accurately represent these data using only 2D shapes. 3D representation provides an ability to represent these items as accurately as possible and provide means for precise determination of position in their natural coordinate systems.

Prior data interrogation techniques in 3D GIS and virtual globes were limited to icons or selected points, lines or polygons on predefined 2-Dimensional surfaces. Prior techniques also did not accurately describe the general N-Dimensional object nor allow for identification of multiple intersections with objects along a topological line of sight.

The disclosed system uses a transparent user interface that allows the user to identify a point on an object that is displayed within an underlying visualization provided by an independent application such as a Virtual Globe (VG). The system provides a transparent interface which enables users to interrogate and manipulate data that is visualized in a virtual globe. An example of a virtual globe is the display provided by Google™ Earth.

The user is in fact navigating a transparent version of a "focus object", which is known to, and described by, the transparent interface and the application providing the underlying visualization. The transparent user interface uses the focus object information to identify arbitrary actions to be taken on behalf of the user, and as defined by the user or a separate third-party application. Focus objects can be described using KML 2.2 with COLLAborative Design Activity (COLLADA). COLLADA is used for establishing an interchange file format for interactive 3D applications. COLLADA defines an open standard XML schema for exchanging digital assets among various graphics software applications that might otherwise store their assets in incompatible file formats. COLLADA documents that describe digital assets are XML files, usually identified with a .dae (digital asset exchange) filename extension. COLLADA is managed by the Khronos Group technology consortium. The KML 2.2 with COLLADA models are used to emulate complex geometric surfaces. Sample data can be obtained from NASA public archives for active remote sensing systems such as CALIPSO and Cloudsat. User defined actions are used to address 1) data extraction from a correlated data archive file, and 2) initiation of a related data analysis or product generation application.

The techniques can be combined with coupling of external applications, for example with Google™ Earth using the Google™ Earth COM Application Programmer Interface (API). By using the described techniques, the GIS-VG coupling is made to include the concept of a "focus object" which is mutually shared by the VG and the interface. Google™ Earth interaction is currently supported through an API downloaded with each installation. The Google™ Earth API could become the basis for a standard and be potentially extended.

Projection of Images

FIG. 1 is a diagram of an example transparent interface that allows independent operations with visualizations in a connected Visualization System (VS), in this case Google™ Earth, operating on Windows XP or Windows Vista (both TM Microsoft Corp.) VS 101 is a render window which shows a visualization image 105 and manipulation controls 107-109 for VS 101. Transparent interface window 121 is superimposed on VS 101, meaning superimposed on the render window. Additional spatial data and related information content are displayed as focus objects.

User-selected Point of Interest (POI) is determined by cursor click in the transparent interface. Point of View (POV) is retrieved and set using the commands "Get POV" and "Set POV". Interpretation of POI as an operation on the VS or an operation on focus objects is governed by the state of the "Select" Radio Buttons.

The result is that the focus object is projected above the VS to show features which are "floating" above the earth's surface. In alternate configurations, the focus object can be projected below the surface, as would be the case for oceanographic data projected onto a VS representation of the ocean surface and/or ocean floor.

Transparent interface window 121 has display data, input data and select boxes (radio buttons), for controlling the display of the transparent interface window 121. When the VS is selected, POI text boxes provide information about the VS scene in the main window, which is VS 101. The text boxes and their units are:

| | | |
|---|---|---|
| Lon | Longitude of POI on VG Surface when {Lon, Lat} checkbox checked; Screen coordinate x of POI when {x, y} checkbox checked; Render window coordinate u of POI when {u, v} checkbox checked | Decimal degrees or Number |
| Lat | Latitude of POI on VG Surface when {Lon, Lat} checkbox checked; Screen coordinate y of POI when {x, y} checkbox checked; Render window coordinate v of POI when {u, v} checkbox checked | Decimal degrees or Number |
| Z | Elevation of POI on the VG Surface when GE radio button is selected; Altitude of POI above or below the VG Surface when Object radio button is selected | meters MSL |

The user's POV selection is accomplished by the use of text boxes as follows:

| | | |
|---|---|---|
| Alt [m] | Altitude of VS Center Point above VS surface; Alt is always zero after Get Camera; users can set Alt to non-zero values | meters |
| Rng [m] | Range of VS Center Point from POV | meters |
| Tilt | Tilt angle of VS Center Point with respect to line of sight from POV; In Google ™ Earth, Tilt is always positive, and ranges from zero (nadir viewing) to 90 degrees (tangent to VG surface) | Decimal degrees |
| Azi | Azimuth of VS Center Point with respect to line of sight from POV; In Google ™ Earth, Azi is angle between the y-axis and the Line of Longitude to the North Pole, and ranges from −90 to +90 degrees (positive when NP is to the left of Center) | Decimal degrees |
| Speed | This parameter determines the rate of movement from one POV to another, and must be greater than zero; If >5.0 then movement to destination is immediate (Google calls this "teleporting") | Number >0 |

Other controls on the transparent interface behave as follows:

| | | |
|---|---|---|
| {Lon, Lat} | Displays POI coordinates as latitude and longitude | CheckBox |
| {x, y} | Displays POI coordinates as pixel number in the render window, where {x, y} = {0, 0} is the upper left hand corner of the visible screen | CheckBox |
| {u, v} | Displays POI coordinates as relative pixel number in the render window, where {u, v} = {0, 0} is the center of the render window, and {u, v} = {−1, 1} is the upper left hand corner of the render window | CheckBox |
| km | Displays Altitude units {z} as km; default is meters | CheckBox |
| Get POV | Extracts POV to {Alt, Rng, Tilt, Azi} and {lon, lat, Z} | Button |
| Get POC | Extracts {lon, lat, Z} of VS Center Point of VS window 101 | Button |
| Absolute | Determines whether elevations are "absolute" or "relative to ground" | CheckBox |
| Set POV | Moves POV to {Alt, Rng, Tilt, Azi} and {lon, lat, Z} | Button |
| GE | The transparent interface operates on the VS, which is in this example Google Earth (GE) | RadioButton |
| Object | The transparent interface operates on focus object | RadioButton |
| Focus Object | Opens another interface to acquire, load and/or identify the focus object from a list of available objects | Button |
| +/− | Opens the Animation Controls (normally not visible) | Button |

The user's POV or "eye position" is obtained using Get POV and can be changed using Set POV. User POV or Camera Position is defined with respect to the center pixel of VS 101 (center pixel of the VS render window). This allows definition of coordinates for a Point of Interest (POI), which is determined by cursor click in the transparent interface. The Point of View (POV) is retrieved and set using the commands "Get POV" and "Set POV". Interpretation of POI as an operation on the VS or an operation on focus objects is governed by the state of "Select" radio buttons.

Figure 2:
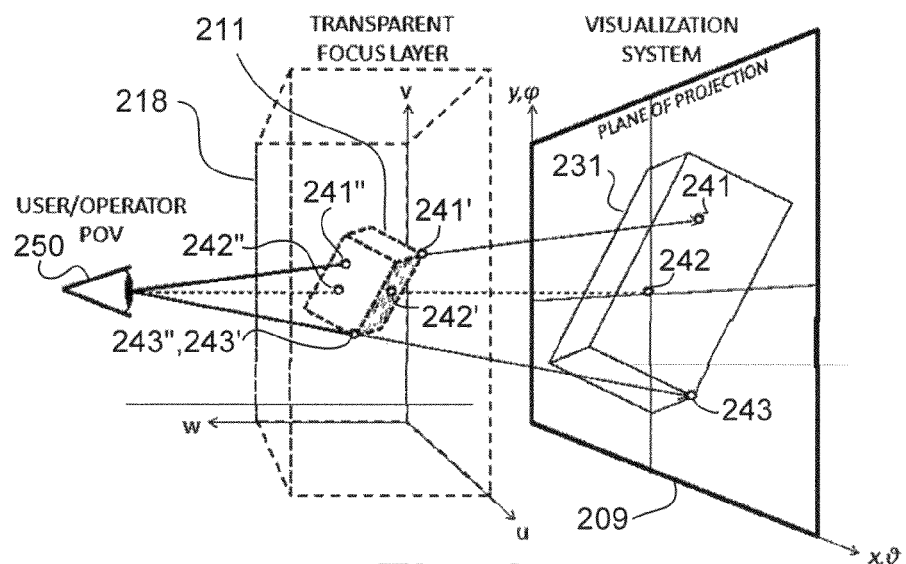
FIG. 2 is a diagram showing geometry of a "focus object" concept.

FIG. 2 is a diagram showing geometry of "focus object" concept whereby a user/operator or external application aligns the spatial description of a focus object with the rendered visual representation of the same object in a plane of projection 209 of the visualization system. An object 211 is located within a transparent focus layer 218. Object 211 is in turn projected to VS as projected object 231. Since the projected object 231 is displayed on VS 101, projected object is displayed in the dimensions as projected on VS 101. The Points of Interest (POI) {241, 242, 243} in the VS are associated with corresponding intersections with the focus object {241", 241', 242", 242', 243", 243'} in focus layer 218, and those intersections are determined along the line of sight between the user's Point of View (POV) 250 and the POI (on projected object 231) in the VS Plane of Projection. The focus objects may be located at any range from the POV 250.

Figure 3:
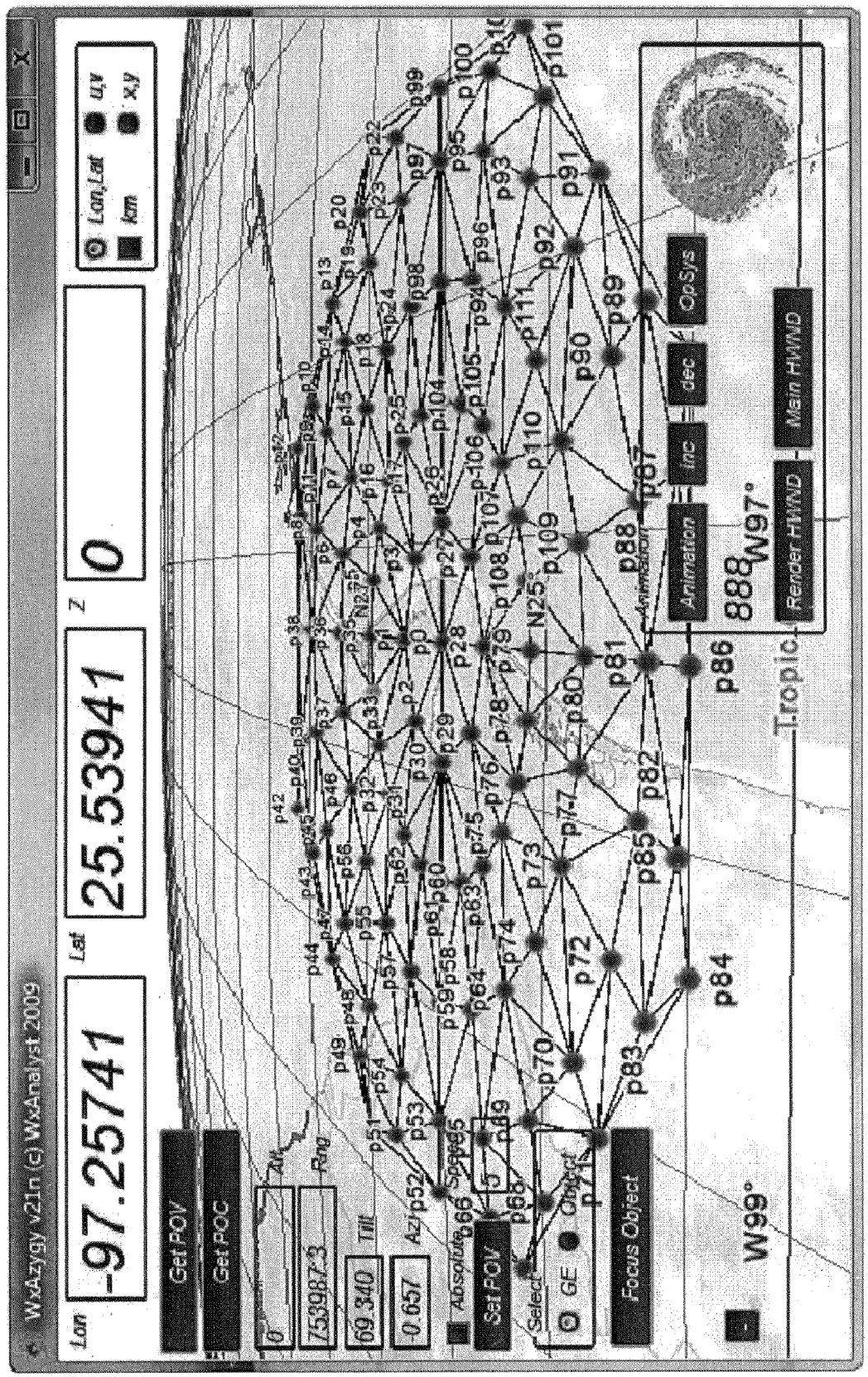
FIG. 3 is a diagram showing a focus layer collection of focus objects.

FIG. 3 is a diagram showing a "focus layer" collection of focus objects, whereby users can operate on more than one focus object at any given time. Each focus object is composed of vertices {points p0, p1, . . . } and attached edges {line segments p0p1, p1p2, . . . } to describe complex spatial objects in the focus layer. These vertices and edges are situated in N-Dimensions as supported by the VS. In one particular configuration, Google™ Earth is used to support the dimensions {x,y,z,t} and additional dimensions are represented using complex spatial objects distributed in {x,y,z,t}. The focus object shown here is a COLLADA model structure for 3D NEXRAD radar surface, made entirely of adjacent triangles. The NEXRAD image shown in the lower right corner is stretched over this surface, and time sequences of such images provide a 4D visualization of radar data at multiple elevation angles. Focus objects may or may not be visible to user.

Figure 4:
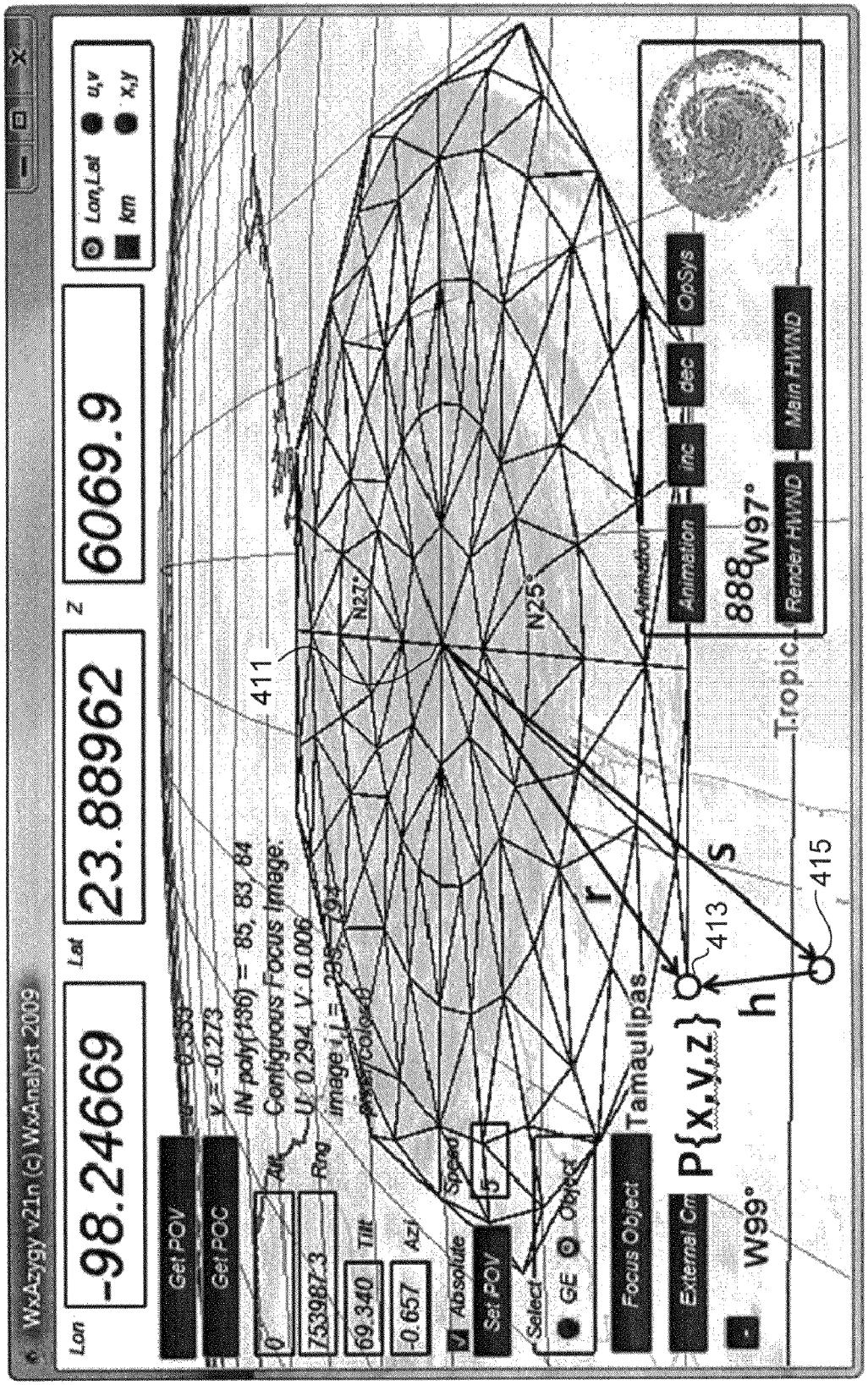
FIG. 4 is a diagram showing a user defined Point of Interest (POI) P{x,y,z} visualized in a field of focus objects.

FIG. 4 is a diagram showing a user defined Point of Interest (POI) 413, identified as P{x,y,z}, as observed from the user's POV (situated above the page and normal to the plane of this figure) and looking at POC 411, which coincides with the position of NEXRAD system KBRO located in Brownsville, Tex. POI 413 is therefore visualized in a field of spatial objects taken from the perspective of the user's POV. Ray r originates from POC 411 and extends to the user's POI 413, coinciding with POI 413, and represents the radar propagation path as seen within the user's Field of View (FOV) in the VS. In this case, the user has selected P{x,y,z} 413 on the NEXRAD radar surface which is at height h=6069.9 meters mean sea level (MSL) above the virtual globe's surface 415. POI 413 identifies a surface location 415 and defines Great Circle distance s along the Globe surface from POC 411 to location 415, and range r along the focus layer from POC 411 to POI 413.

Figure 5:
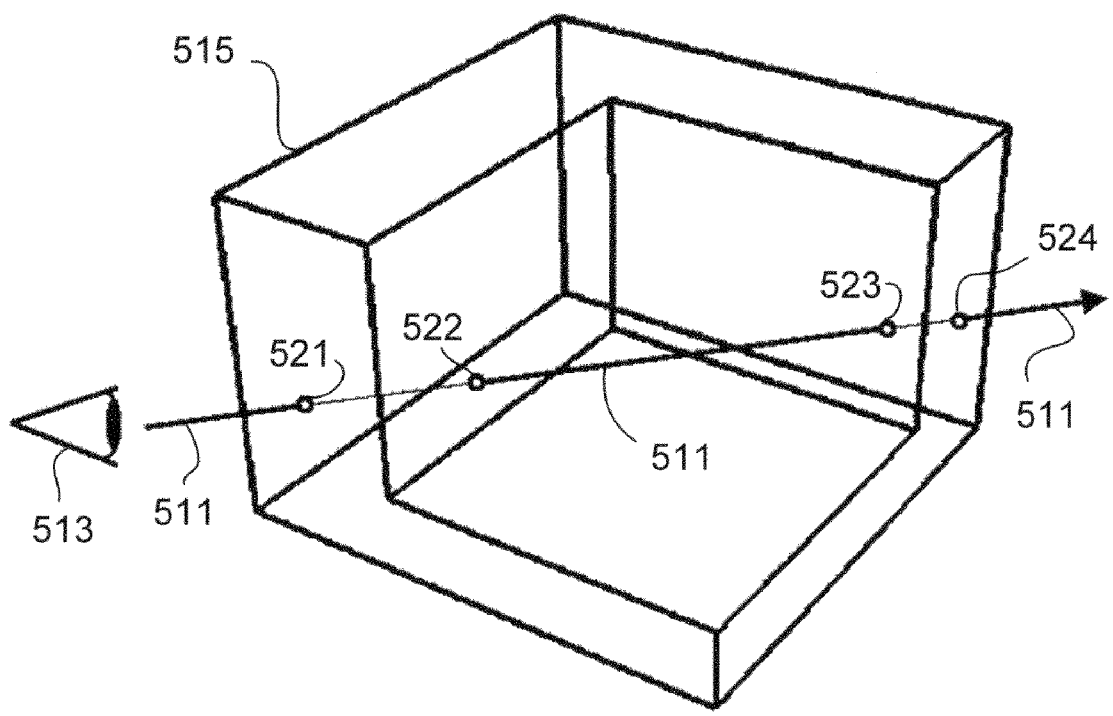
FIG. 5 is a diagram showing identification of points or regions on a focus object that intersect with the topological line of sight.

FIG. 5 is a diagram showing identification of points or regions on a focus object that intersect with the topological line of sight {first, intermediate, . . . last}. In this example, a line of sight 511 extends from POV 513 through focus object 515. Focus object 515 is depicted by surfaces, and so the line of sight 511 crosses various intersections 521, 522, 523, 524, defining different points of interest. Line of sight intersections with focus objects having complex geometries may define one or more POI per user selection. In the example, multiple intersections 521-524 with a focus object establish multiple points of interest, which coincide with intersections 521-524.

Figure 6A:
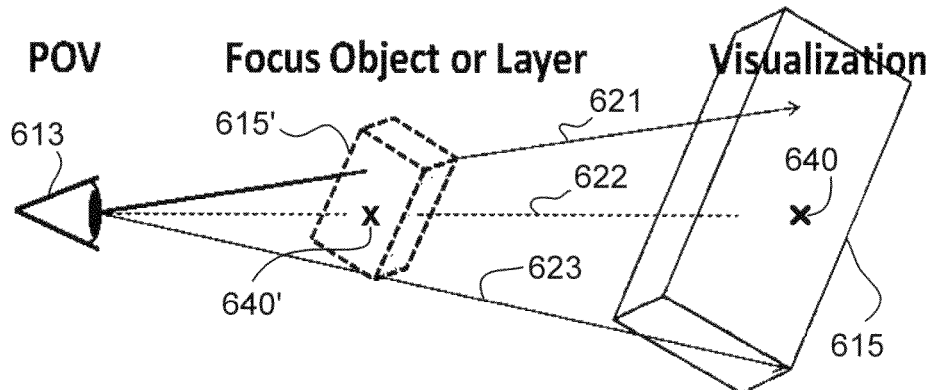
FIGS. 6A and 6B are diagrams showing a method for connecting Point of Interest (POI) coordinates or sets of POI coordinates and related information with external user applications.
Figure 6B:
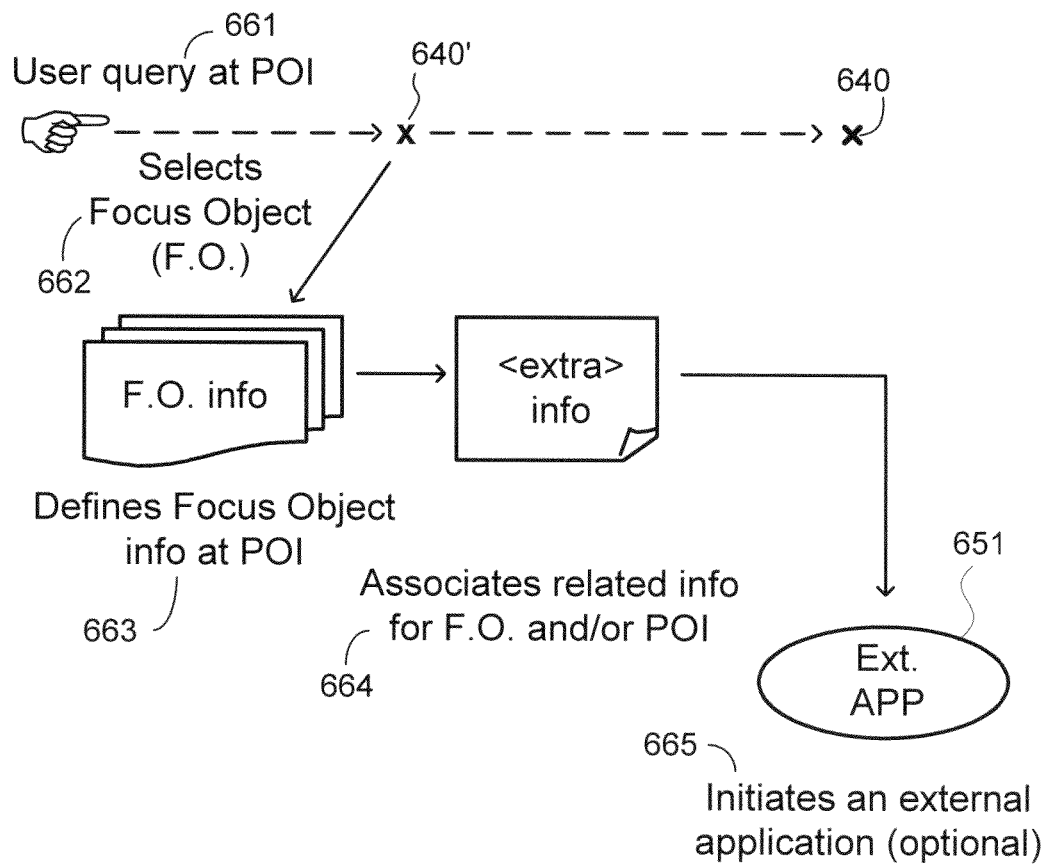

FIGS. 6A and 6B are diagrams showing a method for connecting POI coordinates or sets of POI coordinates and related information with external user applications. FIG. 6A shows a relationship between a focus object and the visualization, and FIG. 6B is a flow diagram of the functional operation. Depicted in FIG. 6A are POV 613, and visualization 615 and focus object 615'. Also depicted are multiple example lines of sight 621, 622, 623. Connecting parameters are defined by the author of focus object 615' in combination with the coordinates associated with a POI 640 and may be used to pass information to an external system 651 (FIG. 6B).

Referring to FIGS. 6A and 6B, user queries (step 661) to POI 640 on displayed object 615 in the VS selects the focus object 615' (step 662) and identifies POI 640' on focus object 615'. The POI 640' on focus object 615' is used to access or retrieve author-defined focus object information (step 663) which includes or references extra or related information (step 664) associated with focus object 615' or POI 640'. Such related information (step 664) may define actions to be taken which may include references to and parameters for external applications (step 665). The technique can include information for the identification of related content in a local or online file system, the specification of units for vertical magnification of the focus object in the virtual globe (VG), or other procedural information that may be passed to or from the transparent interface in a similar fashion.

POV 613 is established by POV coordinates, which provide POV position and POV orientation. Focus object 615' establishes intersection points (e.g., intersections 521-524 in FIG. 5) along the line of sight between POV 613 and the object as displayed 615 in the VS, which information is used to establish mapping information for the focus object 615'. The mapping information includes object information at POI 640 and permits user selection of the object 615' and POI on that object 640'. The mapping information is then used to access correlative information provided by the focus object author in the documents which define the focus object. Such correlative information may include text and data for immediate use, or links to information contained in other files or documents.

Figure 7:
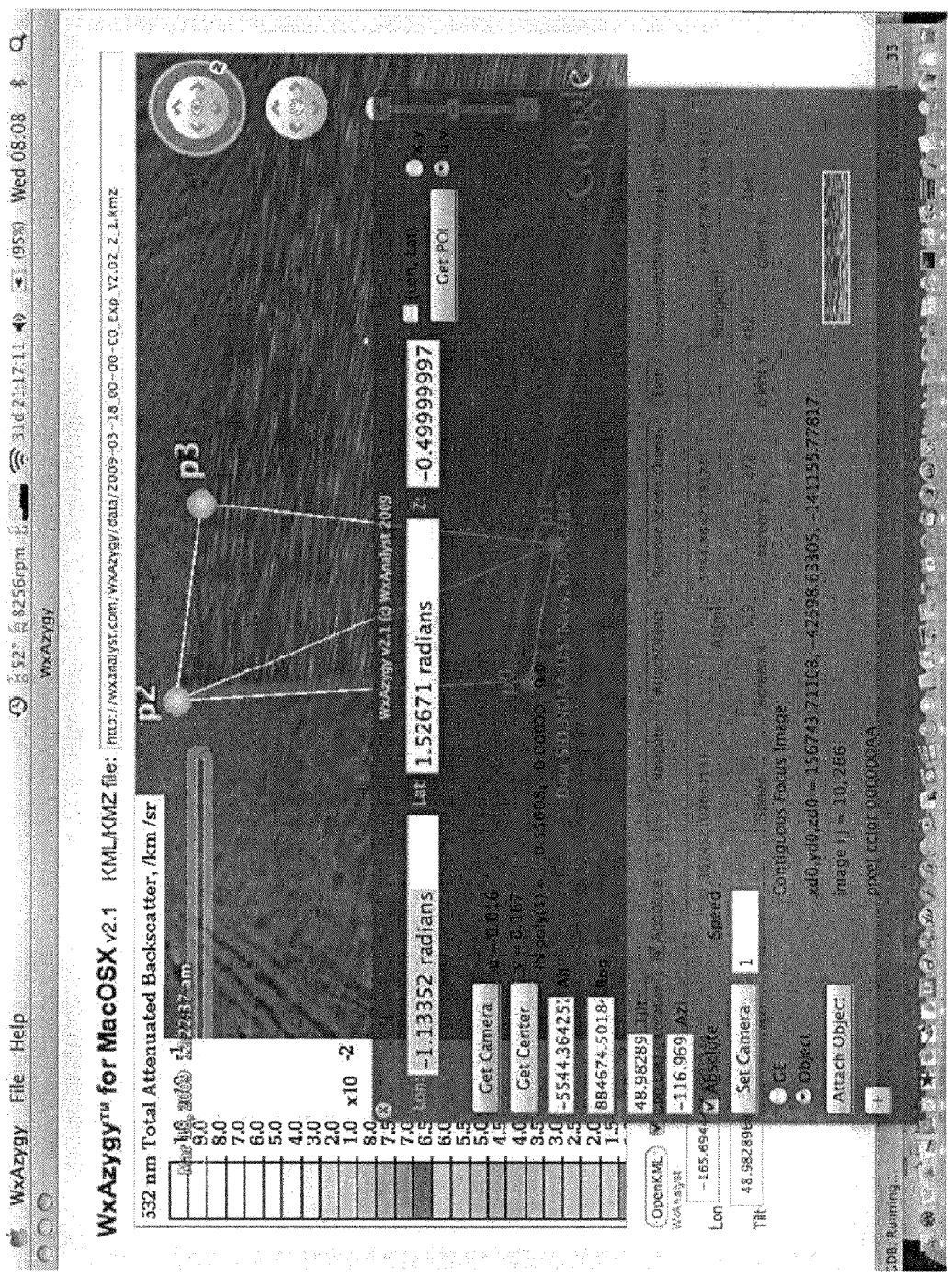
FIG. 7 is a diagram showing an example transparent interface operating on Mac OS using web API for Google™ Earth on the Internet.

FIG. 7 is a diagram showing an example transparent interface operating on Mac OS and using web API for Google™ Earth on the Internet. Transparent interface functionality is similar or identical to that shown in the example transparent interface of FIG. 1, operating on Microsoft® Windows™. In this case, data is loaded from the Internet and the visualization system is operated in a browser.

Figure 8:
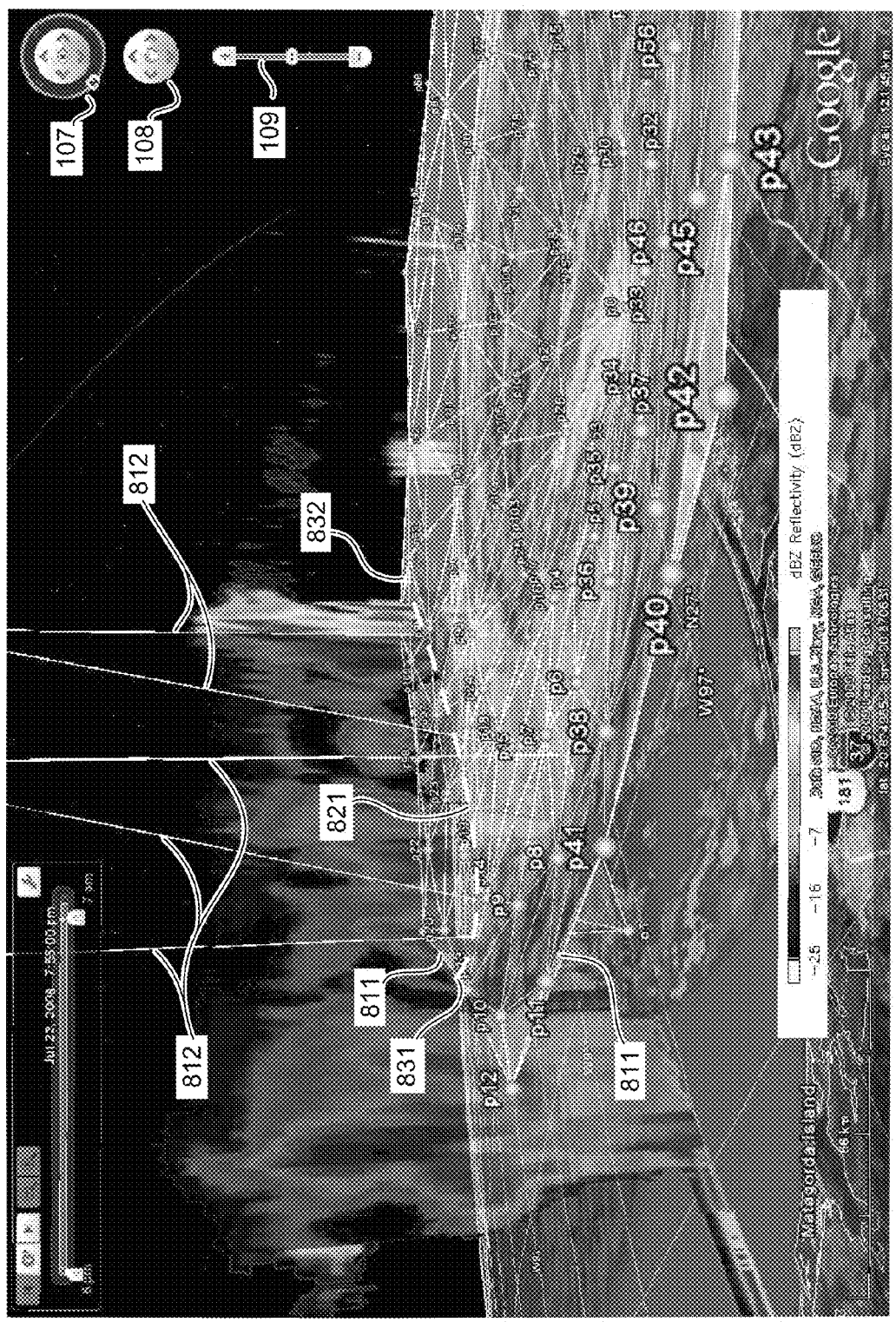
FIG. 8 is a diagram showing 3D combination operation for two focus objects, namely the intersection of two surfaces.

FIG. 8 is a diagram showing 3D combination operations on two focus objects 811, 812 which describe the surfaces created by a surface radar (811) and a satellite-borne radar overpass (812). The intersection of surfaces 811 and 812 defines a line segment 821 which is situated in space from point 831 to point 832. An external application (651, FIG. 6B) may be defined to extract information along this intersection 821 to compare the simultaneous and collocated radar observations in 3D and include qualifying information such as radar sample time difference.

Locations of Focus Objects

The location of a focus object with respect to the image displayed in a visualization system may be positioned anywhere between the user POV and the apparent VG surface, or may extend beyond the VG surface to points located within the VG or beyond the VG.

Focus Objects can also be located below the virtual globe surface for submarine and subterranean applications. This allows the technique to operate with a VS having 3D features above the focal object, and similarly allows the positioning of focus objects below surface features as shown in the VS.

Submarine applications include mapping and analysis of oceanic thermal and salinity structure, current, location of pelagic fish or submerged vehicles, submarine archeological sites and structures, or coral reef or volcanic formations, flora and fauna populations, and manmade structures.

The ability to depict focus objects below the surface permits depiction of underwater features, such as currents and sea floor features. This can be depicted in a display of a transparent interface window (e.g., window 121 in FIG. 1) over a VS depicting the sea surface or seabed. Additionally, this can be depicted over a VS depicting both the sea surface and seabed in a 3D or 4D projection.

Subterranean applications include location of subsurface water and mineral deposits, migration and diffusion of trace chemicals through subsurface water transport, fault location and visualization/analysis of tectonic motion, subsurface stresses, and volcanism. By way of non-limiting example, geological strata obtained from well logging can be depicted below a surface depiction.

The ability to depict focus objects over single-dimensional or multi-dimensional visualization systems permits the projection of tracking information within the system. In the case of underwater projections, this permits the projection of tracking information beneath a depicted surface of the water. Similar projections can be used for mining operations and other depictions of focus objects extending beneath the upper surface of a VS.

Depiction of Additional Data and Nonlinear Projections

Figure 9:
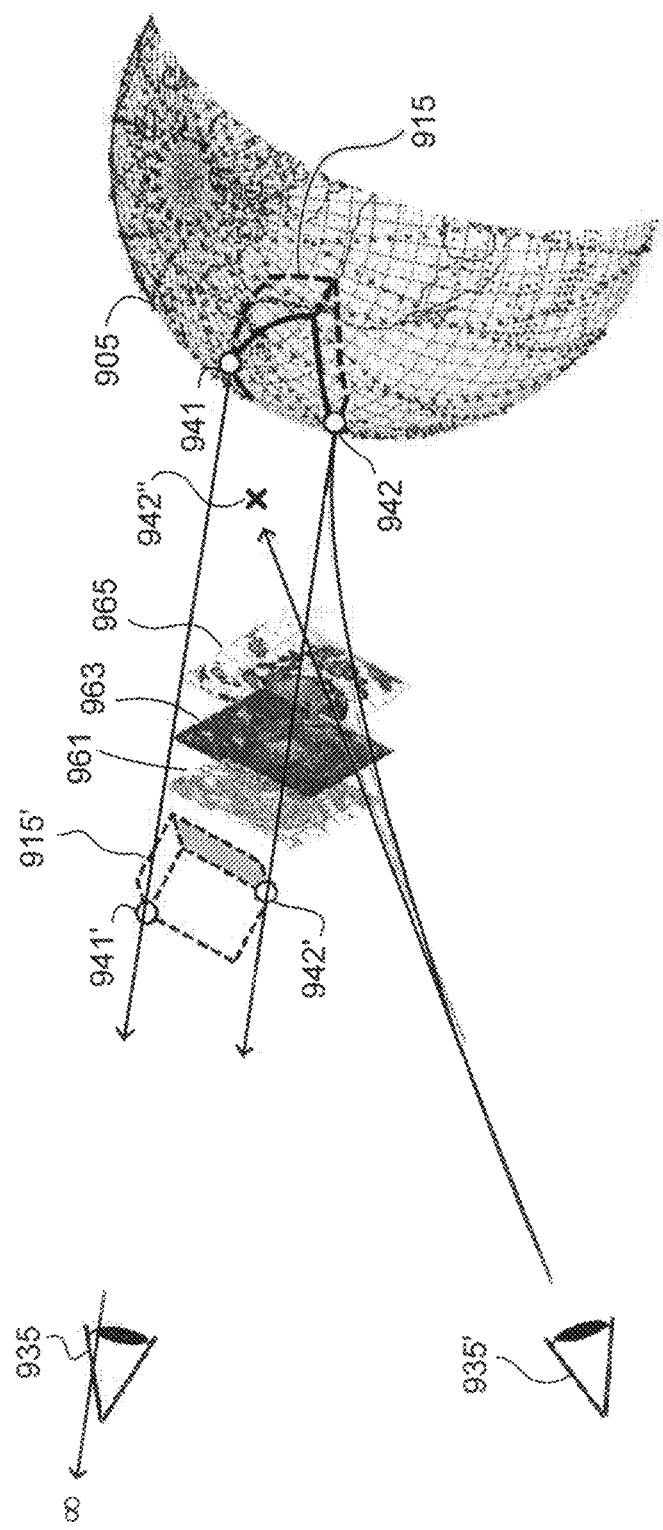
FIG. 9 is a diagram showing a configuration of a non-planar visualization system (VS) adapted to show data with additional dimensions and/or nonlinear line of sight.

FIG. 9 is a diagram showing a configuration of the VS 905 adapted to display data on a non-planar surface, in this case an image of the Earth cast onto a section of a sphere. Images cast onto curved surfaces such as a sphere are used to provide dramatic presentations of the Earth, other planets, or the Sun. The image of an object 915 cast onto VS 905 corresponds to focus object 915' for POV 935 which is shown located at a large distance, for linear lines of sight so that POI 941, 942 on the VS correspond to POI 941', 942' on the focus object.

Data in additional dimensions, in this case Earth imagery obtained in widely different wavelength/frequency bands 961 (microwave), 963 (infrared), 965 (visible), can also be mapped to the POI and referenced by the user or an external application as needed. Additional examples of data in other dimensions include spectrum or frequency information from satellite sensors associated with a point or volume in the atmosphere, or thermodynamic variables such as pressure, temperature, humidity or concentrations of trace species. A common application for mapped data in non-spatial dimensions is spectra of remotely sensed data for each POI, organized by wavelength (optical) or frequency (radio) in one dimension and filter band (pressure depth) in a second dimension. Description of focus objects in N-Dimensions supports transparent interface operations on N-Dimensional data structures, with or without display of the N-Dimensional data in the VS 905.

Time is another dimension which is typically considered to be at sufficiently high speed so that the positions of POI and POV in FIG. 9 are essentially fixed. Despite this, POV motion relative to the POI may be significant within the time of propagation over the line of sight. Consequently, in such situations temporal impacts to position calculations become important and must be included.

Also shown in FIG. 9 is a non-linear propagation condition where the ray from POI 942 would be viewed at POV 935', and the apparent position of POI 942' on the focus object may be located in another position 942".

Nonlinear propagation examples include focus object positioning in highly refractive media such as underwater applications, vision through high temperature gradients associated with fires, or high angle of incidence viewing through refractive index gradients associated with satellite occultation, vision through surface layers (mirages), and radio propagation and imaging in humid atmospheres.

Operation

Step 1—The focus object (FO) is fully described in the Visualization System (VS) to include:
  a) information on focus object shape, orientation and scale size with respect to the focus object coordinate system, and
  b) the position, orientation and scale size of the focus object in the VS coordinate system.

The VS uses this information to display the focus object. The transparent interface must have access to both a) and b).

Step 2—Each focus object is subdivided into a collection of unique component vertices (points) and edges (lines). The transparent interface calculates coordinates of these vertices and edges in the VS Coordinate System by applying transformations for a) focus object scale size, b) 3-axis rotations for focus object orientation, and c) focus object position.

Step 3—The user identifies one or more focus object(s) as a focus layer to exclude operations on any focus objects that are not of interest. The focus objects not of interest are received and identified as an excluded complement set of one or more focus objects not of interest. The excluded complement set may then be excluded from display. In one configuration the excluded complement set are contained within a focus layer and that focus layer is excluded.

Step 4—The user or external application provides coordinates of a Point of Interest (POI) in the VS Plane Of Projection (POP) or Surface of Projection (SOP). Position in the VS POP or SOP is provided in relative units with respect to the user's or external application's Point Of View (POV) in the VS Coordinate System.

Step 5—The transparent interface calculates the apparent position for all focus objects in the VS POP or SOP with respect to the user's or external application's POV. If the POV or focus object has not moved or has not been changed and the apparent focus object positions are known from a previous calculation, then there is no need for them to be recalculated. The transparent interface calculates apparent position in the VS POP or SOP by applying transformations for
  a) 3-axis rotations for POV orientation, and
  b) scaling for apparent distance of the user or external application from the VS POP or SOP.

Step 6—All focus layer focus object(s) are reviewed to determine if the POI is located within the focus object. By way of example, for a complex focus object with large numbers of vertices and edges, a quick approximation is used to reduce the field of candidate intersections, then exact calculations are employed to determine which of these candidate focus object(s) intersect or contain the POI.

Step 7—Each POI with focus object intersection(s) is transformed in reverse order of the previous Step 5 to determine a position of each POI intersection in the natural coordinates of the VS Coordinate System, and this position information is passed to the user or external application.

Step 8—Each POI with focus object intersection(s) is further transformed in reverse order of the previous Step 2 to determine position of each POI intersection in the natural coordinates of the focus object.

Step 9—If present and available, the coordinates of the POI intersection(s) within the natural coordinate systems of images, layers, objects or other entities that are logically tied to the focus object at the POI are calculated and passed to the user or external application.

Step 10—End.

The steps result in a transformation of data for display as visual data superimposed on a visualization system as a transparent interface. The "transparent interface" is a window overlaid on top of another display, but which allows viewing of the other display through the window. The procedure would be:

Select a focus object based on:
  a) information on focus object shape, orientation and scale size with respect to the focus object coordinate system, and
  b) the position, orientation and scale size of the focus object in a coordinate system of the visualization system, The visualization system uses the focus object information to display the focus object.

Subdivide each focus object into object components.

Calculate coordinates of the components in the coordinate system of the visualization system.

Receive coordinates of a Point of Interest.

Calculate an apparent position of focus objects in the visualization system.

Project the focus object with respect to a selected POV

Project each Point of Interest in the selected POV using the calculated coordinates of the components.

Find all intersections of the Point of Interest with focus objects along the POV line of sight. In the case of a display intended to duplicate the result of a 2-Dimensional optical image stretched onto a surface which is suspended in at least 3 dimensions, the intersections of the Point of Interest would be taken along the POI-POV line of sight.

Functions

A "transparent interface" that allows independent operations on user-selected information in coordination with visualizations in a connected visualization system (VS). Independent operations include the loading and unloading of spatial data and related information content, identification and selection of data location and related content at a user-selected Point of Interest (POI) from the user's Point of View (POV), and coordination of selected data objects with external user applications that may or may not be independent of the connected VG.

A "focus object" concept whereby users can identify which spatial object(s) in a visualized field of spatial objects will contain the user-selected POI. Focus objects with complex geometries may have one or more POI per user selection along the user's line of sight within the user's Field of View (FOV) in the VS. Focus objects may or may not be visible to the user.

A "focus layer" collection of focus objects, whereby users can operate on more than one focus object at any given time.

The geometry of the "Focus Object" concept allows a user/operator or external application to align the spatial description of a focus object with the rendered visual representation of the same object in the Plane of Projection (POP) or Surface of Projection (SOP) of the visualization system. The POI in the visualization system are associated with corresponding intersections with the focus object in the focus layer of the transparent interface, and those intersections are determined along the line of sight between the user's POV and the POI in the visualization system POP or SOP. The focus objects may be located at any range from the POV.

The technique provides for connecting POI coordinates or sets of POI coordinates and related information with external user applications. Connecting parameters are defined by the author of the focus object and may be used to pass information to an external system. It is possible to include information for the identification of related content in a local or online file system, the specification of units for vertical magnification of the focus object in the VG, or other procedural information that may be passed to or from the transparent interface in a similar fashion.

The technique provides for representing, creating, and editing focus objects for use in the transparent interface.

The technique allows for provision of Geographic Information Science (GIScience) procedures and algorithms as intrinsic functions within the transparent interface, for user manipulation of focus objects and focus layers. Intrinsic GIScience functions operate on points, lines, polygons, surfaces, and volumes in the 3D/4D environment of the connected VG, and which include but are not limited to spatial intersection, union, collocation (within vicinity or range of), and relational selection by content.

The technique requires or provides an Application Programmer Interface (API) to the visualization system (VS). The VS API supports operations of the transparent interface on a connected visualization system (VS). The visualization system API allows the transparent interface to operate in a similar fashion across multiple visualization systems.

3D/4D Displays and Display of Non-Euclidian Patterns

The transparent interface and intrinsic GIScience procedures and algorithms (from the 3D/4D example) can be extended to N-Dimensional focus objects. This extension to the N-Dimension focus objects takes advantage of a set of POI which are uniquely defined with respect to the user POV.

The transparent interface can be extended to visualization systems with non-Euclidean geometries such as visual environments with non-uniform refractive indexes. In such conditions, the lines of sight from POV to the POI may or may not be a straight line or ray. Thus if radar return patterns are refracted, the technique is able to depict the effects of refraction on the visualization system.

This ability to display non-Euclidean geometries can be used to resolve NEXRAD patterns and similar data into models of actual real-world conditions. For example, some storm pattern tops (echo tops) will appear artificially high in proportion to distance from the NEXRAD station, and in many cases "confirmed" by correct readings from neighboring stations. By adjusting the geometries according to a calculation of refractions and similar geometric effects, a more accurate model is presented.

In the case of geometries on a virtual globe VS, the refracted geometry is also superimposed on the terrestrial presentation of the virtual globe VS. Thus, the transparent interface includes the adjusted model of the superimposed information, further adjusted according to the presentation of the virtual globe VS. Such non-linear propagation can be caused by gradients of refractive index where the line of sight is a curved ray and is associated with changes in the speed of propagation, such as experienced with mirages and refractive index turbulence. Non-linear propagation is also experienced on the Galactic scale where light is observed to be deflected in the vicinity of strong gravitational fields; in radio propagation where radio refractive index is a strong function of humidity and temperature, and in sonic imaging applications where the speed of sound is a function of density.

In a more general sense, the information presented on the transparent interface is modified according to calculated real world conditions and is further modified according to a visualization scheme or method of the VS. Alternatively, the information presented on the transparent interface is modified according to calculated real world conditions and is further modified according to an adjustment used to render each displayed object in the VS.

In the case of Euclidian images, such as non-refracted active sensor returns, the ability to merge the data in the transparent interface with the VS data and accommodate non-Euclidian shapes makes it possible to accept data for the transparent interface which is either modified to accommodate effects of Earth's curvature or which is not modified. The projection of the data in the transparent interface is able to be adjusted to coincide with the VS data, and thereby render visualizations of the two sets of data in a correct representation of the overlay.

The transparent interface to non-planar visualization systems such as 2D projections onto spherical globe surfaces can be extended. This includes extension to real or virtual 3D environments where the user is immersed in the display medium. 3D VS have also been devised using stereo imaging of planar or curved surfaces, and actual 3D images using holographic techniques. In each case of these visualization systems, focus objects can be defined which will allow the user to characterize displayed information and operate on that information in a manner which is independent of the visualization system. The principles of the transparent interface method remain the same, and involve the identification of POI as intersections of the line of sight between the displayed object and user POV.

Use

The transparent interface enables users to interrogate and manipulate data that is visualized in a 4D Virtual Globe (VG) such as Google™ Earth. VG users normally define a Point of Interest (POI) by clicking on the VG, which interprets the request to return position {longitude, latitude, elevation} of that location on the VG surface. In addition, a user click on active content (namely, an <ICON>) reveals information associated with that content through a Keyhole Markup Language (KML) document. Not all data is confined to the Earth surface, however, including weather and oceanographic models, and remote sensing information from ground-based systems and spacecraft. When users click on features which are "floating" above the Earth surface or in the ocean, the disclosed Transparent Interface interprets that request and extracts the location of the POI on those features in situ (FIG. 4).

The technique is used to support the examination of 4D content. The 4D content is visualized in a VG, using COLLADA models to define operations on "Focus Objects". The interface not only identifies the location {x,y,z,t} of the POI on the COLLADA model surface, but goes further to extract any image content that may be attached by the COLLADA model at each POI. Going deeper, any POI may also define image coordinates that may be used by an external application to identify correlative external data through a file system or URL. In this way, the interface becomes a portal or hyperlink into large 4D datasets that are visualized in a VG.

The described techniques provide application coupling with independent and transparent light client overlay for any visualization system which is provisioned with the necessary and sufficient Application Programmer Interface (API). Author modifications of COLLADA descriptions of spatial objects through the xml<extra type="external"> statement provides an ability to pass additional author-defined information from the transparent interface to external applications. It is further possible to provide independent operation of a software client not subject to update cycle or licensing restrictions of the target visualization system with which the client interacts. This additional function by the software client is described as a "light client" because it does not impose significant computing requirements beyond that of the underlying visualization system.

The technique may be used with other geographical visualization systems such as NASA World Wind. The technique is also not limited to 4D Virtual Globe technologies. The system can function with a geographical visualization system using KML/COLLADA information from various remote sensing systems including NEXRAD, CALIPSO and Cloudsat satellite remote sensors, DWL and HSRL airborne LIDAR.

Co-registration of features in the transparent interface allows the focus objects to be displayed on a visualization system accurate at least to the pixel level of the display screen resolution.

Development Techniques

The present technique can be used to combine geometries to create compelling visualizations of LIDAR and radar data and derived products in a virtual globe system or other geographical mapping display. A combination of COLLADA model surfaces is used for the introduction of more complex N-Dimensional geometries. The technique is able to create COLLADA surfaces in real time for mobile radar or lidar and satellite applications.

The interface is able to provide user control of the virtual globe functions including position and magnification, time, and support for queries of embedded data layers. The interface allows a user to interact with a VG scene by passing information on position, plus additional controls for position in space, point of view or orientation, and time. The interface is transparent and provides functionality that can be operated independently of the VG.

CONCLUSION

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A method for superimposing a representation of displayed data on a visualization system, the method comprising:

acquiring at least one focus object described in the visualization system;

using focus object information to display the focus object;

subdividing each focus object into a plurality of object components;

using a transparent interface to calculate coordinates of components of the focus object in a coordinate system of the visualization system, said focus object mutually shared by the visualization system and the interface;

receiving coordinates of a point of interest in a projection of the visualization system;

projecting the point of interest (POI) in a selected Point of View (POV) using the calculated coordinates and the received coordinates of the point of interest in the projection of the visualization system of N-Dimensional features in the visualization, independent of user point of view;

reviewing said at least one focus object to determine instances of the point of interest located within the focus object;

determining position of each point of interest intersection in natural coordinates of the visualization system coordinate system by transforming the points of interest with focus object intersection in reverse order of said calculating an apparent position for focus layer focus objects in the visualization system of projection;

providing the determined positions of each point of interest to a user or to an external application; and further transforming each point of interest with focus object intersection to determine position of each point of interest intersection in the natural coordinates of the focus object by combining the component vertices and edges to form focus objects.

2. The method of claim 1, further comprising:

in the case of a change in a focus object or a change in position of the focus object, calculating an apparent position of focus objects in the visualization system, as projected with respect to the selected POV.

3. The method of claim 1, wherein the focus object includes:

a) information on focus object shape, orientation and scale size with respect to the focus object coordinate system, and b) the position, orientation and scale size of the focus object in the coordinate system of the visualization system, wherein the visualization system uses the focus object information to display the focus object.

4. The method of claim 1, further comprising:

determining an instance of multiple intersections of the point of interest along a predetermined line of sight; and responsive to a determined instance of the multiple intersections of the point of interest, projecting the point of interest to find at least a subset of intersections with focus objects along the line of sight.

5. The method of claim 1, further characterized by:

calculating the apparent position in the visualization system of projection by applying transformations for:

a) 3-axis rotations for POV orientation, and b) scaling for apparent distance of a user or external application from the visualization system of projection.

6. The method of claim 1, further comprising logically relating the points of interest intersection within natural coordinates of the visualization system coordinate system by calculating the coordinates of the point of interest intersection within the natural coordinates of the visualization system coordinate system in combination with images, layers, objects or other entities logically tied to the focus object at the point of interest; and providing the calculated coordinates to a user or an external application.

7. The method of claim 1, wherein the received coordinates of the point of interest in a projection of the visualization system include coordinates for a plurality of points of interest along a line of sight.

8. The method of claim 7, wherein the user can operate on more than one focus object at any given time.

9. The method of claim 1, further comprising:

receiving further information concerning of the focus object from an external source;

identifying related content in a data store; and using the related content to apply the further information in the coordinates of the visualization system to provide the transparent interface over the visualization system.

10. The method of claim 1, further characterized by:

calculating the apparent position in the visualization system of projection beneath a surface location displayed by the visualization system.

11. The method of claim 1, further characterized by:
calculating the apparent position in the visualization system of projection beneath a surface location displayed by the visualization system by applying transformations for:
   a) 3-axis rotations for POV orientation, and
   b) scaling for apparent distance of a user or external application from the visualization system of projection.

12. The method of claim 1, further comprising:
using Geographic Information Science (GIScience) intrinsic functions within the transparent interface, for user manipulation of N-Dimensional focus objects, the GIScience intrinsic functions operating in the environment of the visualization system, comprising spatial intersection, union, collocation and relational selection by content.

13. The method of claim 1, further comprising:
using, in the transparent interface, non-Euclidean geometries or visual environments with non-uniform refractive index.

14. The method of claim 1, further comprising:
using, as the visualization system, a non-planar 2D projection onto a spherical or other non-planar visualization surface.

15. A computer program product capable of providing a transparent interface that allows independent operations on user-selected information in coordination with a visualization system, the computer program product comprising:
   a non-transitory computer-readable medium comprising:
      a first instruction for causing a computer to load spatial data and related information content into a memory store;
      a second instruction for causing the computer to identify and select a data location and related content at a user-selected point of interest from a selected point of view (POV);
      a third instruction for causing the computer to acquire a focus object from the visualization system and to use focus object information to display the focus object;
      a fourth instruction for causing the computer to subdivide each focus object into a plurality of object components;
      a fifth instruction for causing the computer to calculate coordinates of the components in a coordinate system of the visualization system, said focus object mutually shared by the visualization system and the interface, thereby establishing the components in the coordinate system suitable for display in the transparent interface over the visualization system;
   a sixth instruction for causing the computer to receive coordinates of a point of interest in a projection of the visualization system;
      a seventh instruction for causing the computer to project the point of interest in the POV as the transparent interface, using the calculated coordinates and the received coordinates of the point of interest of the projection of N-Dimensional features in the visualization, independent of user point of view;
      an eighth instruction for causing the computer to review said at least one focus object to determine instances of the point of interest located within the focus object;
   a ninth instruction for causing the computer to determine positions of each point of interest intersection in natural coordinates of the visualization system coordinate system by transforming the points of interest with focus object intersection in reverse order of said calculating an apparent position for focus layer focus objects in the visualization system of projection;
   a tenth instruction for causing the computer to provide the determined positions of each point of interest to a user or to an external application: and
      an eleventh instruction for causing the computer to further transform each point of interest with focus object intersection to determine position of each point of interest intersection in the natural coordinates of the focus object by combining the component vertices and edges to form focus objects.

16. The computer program product of claim 15, wherein the projection of the point of interest includes coordination of selected data objects with external user applications independent of the visualization system.

17. The computer program product of claim 15, wherein the computer-readable medium further comprises:
   instructions for, in the case of a change in a focus object or a change in position of the focus object, calculating an apparent position of focus objects in the visualization system, as projected with respect to a selected POV.

18. A method for superimposing a display of visual data on a visualization system, the method comprising:
   acquiring a focus object from in the visualization system, wherein the focus object includes:
      a) information on focus object shape, orientation and scale size with respect to the focus object coordinate system, and
      b) the position, orientation and scale size of the focus object in the visualization system coordinate system,
   wherein the visualization system uses the focus object information to display the focus object;
   subdividing each focus object is subdivided into a collection of unique component vertices (points) and edges (lines);
   using a transparent interface to calculate coordinates of these vertices and edges in the visualization system coordinate system by applying transformations for focus object scale size, 3-axis rotations for focus object orientation, and focus object position, said focus object mutually shared by the visualization system and the interface;
   receiving an identification of one or more focus objects as an excluded complement set for exclusion of one or more focus objects not of interest;
   excluding the excluded complement set;
   receiving coordinates of a point of interest in a plane of projection or surface of projection of the visualization system;
   positioning in the visualization system plane of projection or surface of projection is provided in relative units with respect to the user's or external application's point of view (POV) in the visualization system coordinate system;
   calculating an apparent position for focus layer focus objects in the visualization system plane of projection or surface of projection with respect to the user's or external application's POV, except in the case of the POV or focus object having not moved or having not changed and the apparent focus object positions known from a previous calculation;
   calculating an apparent position in the visualization system plane of projection or surface of projection by applying transformations for:

a) 3-axis rotations for POV orientation, and
b) scaling for apparent distance of the user or external application from the visualization system plane of projection;

reviewing the focus layer focus objects to determine instances of the point of interest located within the focus object;

determining position of each point of interest intersection in natural coordinates of the visualization system coordinate system by transforming the points of interest with focus object intersection in reverse order of said calculating an apparent position for focus layer focus objects in the visualization system plane of projection or surface of projection;

providing the determined positions of each point of interest in the projection of the visualization system of N-Dimensional features in the visualization to the user or to an external application; and further transforming each point of interest with focus object intersection to determine position of each point of interest intersection in the natural coordinates of the focus object by combining the component vertices and edges to form focus objects.

* * * * *

UNITED STATES PATENT AND TRADEMARK OFFICE
CERTIFICATE OF CORRECTION

PATENT NO. : 8,392,853 B2
APPLICATION NO. : 12/585025
DATED : March 5, 2013
INVENTOR(S) : Scott T. Shipley Page 1 of 1

It is certified that error appears in the above-identified patent and that said Letters Patent is hereby corrected as shown below:

In the Specifications:

Column 1, Line 7, insert the following caption and paragraph:

--STATEMENT REGARDING FEDERALLY SPONSORED RESEARCH OR DEVELOPMENT

This invention was made with Government support under contract NNX09CF28P awarded by NASA. The Government has certain rights in the invention.--

Signed and Sealed this
Fourteenth Day of May, 2013

Teresa Stanek Rea
*Acting Director of the United States Patent and Trademark Office*